United States Patent
Mutter et al.

(10) Patent No.: US 11,580,050 B2
(45) Date of Patent: Feb. 14, 2023

(54) USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Steffen Walker, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/298,462

(22) PCT Filed: Dec. 11, 2019

(86) PCT No.: PCT/EP2019/084608
§ 371 (c)(1),
(2) Date: May 28, 2021

(87) PCT Pub. No.: WO2020/120555
PCT Pub. Date: Jun. 18, 2020

(65) Prior Publication Data
US 2022/0035764 A1    Feb. 3, 2022

(30) Foreign Application Priority Data
Dec. 13, 2018    (DE) .................. 10 2018 221 681.9

(51) Int. Cl.
*G06F 13/42*    (2006.01)
*H04L 12/413*    (2006.01)
*H04L 12/40*    (2006.01)

(52) U.S. Cl.
CPC ...... *G06F 13/4282* (2013.01); *H04L 12/4135* (2013.01); *G06F 2213/0008* (2013.01); *H04L 2012/40215* (2013.01)

(58) Field of Classification Search
CPC ......... G06F 13/4282; G06F 2213/0008; H04L 12/4135; H04L 2012/40215
See application file for complete search history.

(56) References Cited

U.S. PATENT DOCUMENTS

2015/0095711 A1*  4/2015  Elend ................... G06F 11/261
                                                                  714/39
2015/0370315 A1* 12/2015  Unnikrishnan ....... G06F 1/3278
                                                                  713/323

(Continued)

FOREIGN PATENT DOCUMENTS

CN    103098419 A     5/2013
DE    102017211860 B3  9/2018

OTHER PUBLICATIONS

ISO 11898-1:2015 Standard, 2015, pp. 1-74.
International Search Report for PCT/EP2019/084608, dated Mar. 18, 2020.

*Primary Examiner* — Henry Tsai
*Assistant Examiner* — Harry Z Wang
(74) *Attorney, Agent, or Firm* — Norton Rose Fulbright US LLP; Gerard Messina (57) ABSTRACT

A user station for a serial bus system. The user station includes a receiver for receiving a signal from a bus of the bus system, and a device for evaluating the reception signal that is output by the receiver. The receiver generates a digital reception signal from the signal received from the bus and to output the signal to the device at a terminal. The device evaluates the digital reception signal with regard to a predetermined communication protocol that establishes when a predetermined communication phase, which indicates a subsequent transfer of useful data in a message, begins and ends. The device reverses the data flow of the digital reception signal to the receiver at the terminal for a time period of at least one bit if the evaluation of the device shows (Continued)

that data at that time are being received from the bus in the predetermined communication phase.

9 Claims, 3 Drawing Sheets

(56) References Cited

U.S. PATENT DOCUMENTS

| | | | |
|---|---|---|---|
| 2018/0137071 A1* | 5/2018 | Sturm | H04L 12/40169 |
| 2019/0020499 A1* | 1/2019 | Meier | H04L 12/4135 |
| 2019/0288870 A1* | 9/2019 | de Haas | H04L 12/40032 |
| 2020/0213351 A1* | 7/2020 | Shin | H04L 63/1408 |

* cited by examiner

USER STATION FOR A SERIAL BUS SYSTEM, AND METHOD FOR COMMUNICATING IN A SERIAL BUS SYSTEM

FIELD

The present invention relates to a user station for a serial bus system, and a method for communicating in a serial bus system that operates with a high data rate and a high level of error robustness.

BACKGROUND INFORMATION

For the communication between sensors and control units, for example in vehicles, a bus system is frequently used in which data are transferred as messages under the ISO 11898-1:2015 standard, as a CAN protocol specification with CAN FD. The messages are transferred between the bus users of the bus system, such as the sensor, control unit, transducer, etc.

With the increasing number of functions of a technical facility or of a vehicle, the data traffic in the bus system also increases. Moreover, it is often necessary for the data to be transferred from the transmitter to the receiver more quickly than previously. As a result, the required bandwidth of the bus system is further increased.

To allow data to be transferred at a higher bit rate than with CAN, an option has been provided in the CAN FD message format for changing over to a higher bit rate within a message. In such technologies, the maximum possible data rate is increased beyond a value of 1 Mbit/s by using higher clocking in the area of the data fields. Such messages are also referred to below as CAN FD frames or CAN FD messages. With CAN FD, the useful data length of 8 bytes is increased up to 64 bytes, and the data transfer rates are much higher than with CAN.

Even though a CAN- or CAN FD-based communications network provides a very large number of advantages with regard to its robustness, for example, its speed is much slower compared to a data transfer via 100Base-T1 Ethernet, for example. In addition, the useful data length of up to 64 bytes, achieved thus far with CAN FD, is too small for some applications.

SUMMARY

An object of the present invention is to provide a user station for a serial bus system, and a method for communicating in a serial bus system, which solve the above-mentioned problems. In particular, an object of the present invention is to provide a user station for a serial bus system, and a method for communicating in a serial bus system in which a high data rate and an increase in the quantity of the useful data per frame may be achieved with a high level of error robustness.

The object may be achieve by a user station for a serial bus system in accordance with an example embodiment of the present invention. In accordance with an example embodiment of the present invention, the user station includes a receiver for receiving a signal from a bus of the bus system, in which bus system at least one first communication phase and one second communication phase are used for exchanging messages between user stations of the bus system, and a device for evaluating the reception signal that is output by the receiver, the receiver being designed to generate a digital reception signal from the signal received from the bus and to output the signal to the device at a terminal, the device being designed to evaluate the digital reception signal with regard to a predetermined communication protocol that establishes when a predetermined communication phase, which indicates a subsequent transfer of useful data in a message, begins and ends, and the device being designed to reverse the data flow of the digital reception signal to the receiver at the terminal for a time period of at least one bit if the evaluation of the device shows that data at that time are being received from the bus in the predetermined communication phase.

In accordance with an example embodiment of the present invention, by use of the user station, it is possible in particular to maintain an arbitration set forth in CAN in a first communication phase and still increase the transfer rate considerably compared to CAN or CAN FD. This may be achieved by using two communication phases having different bit rates, and making the start of the second communication phase, in which the useful data are transferred at a higher bit rate than in the arbitration, clearly identifiable for the transceiver device. The transceiver device may thus reliably switch over from a first communication phase into the second communication phase. As a result, a substantial increase in the bit rate, and thus in the transfer speed from the sender to the receiver, is achievable. However, at the same time a high level of error robustness is ensured. This contributes toward achieving a net data rate of at least 10 Mbps. In addition, the quantity of the useful data may be up to 4096 bytes per frame, The method carried out by the user station may also be used when at least one CAN user station and/or at least one CAN FD user station that transmit(s) messages according to the CAN protocol and/or CAN FD protocol are/is present in the bus system.

Advantageous further embodiments of the user station are disclosed herein.

According to one option of the present invention, the user station also includes a transceiver device that includes the receiver, and a transmitter for transmitting messages onto the bus, and a communication control device for controlling a communication of the user station with at least one other user station of the bus system, the communication control device including the device.

The user station also possibly includes a transceiver device that includes the receiver, and a transmitter for transmitting messages onto a bus of the bus system, and a communication control device for controlling a communication of the user station with at least one other user station of the bus system, the communication control device including the device.

In accordance with an example embodiment of the present invention, the device may be designed to prompt the communication control device to transmit, at the terminal for the digital reception signal, an identifier having a predetermined value to the receiver in the predetermined communication phase in which the device reverses the data flow of the digital reception signal.

For example, the identifier is a bit having a predetermined value, or the identifier is a predetermined bit pattern.

In accordance with an example embodiment of the present invention, the communication control device may be designed to transmit a transmission signal to the transceiver device, which the transceiver device uses as the basis for the signals for the bus wires, and the device being designed to compare the reception signal to the transmission signal generated by the communication control device in order to determine whether the identifier is to be transmitted.

According to one option of the present invention, bus states of the signal received from the bus in the first communication phase are generated with a different physical layer than bus states of the signal received from the bus in the second communication phase.

In the first communication phase, bits of the signals possibly have a bit time that is greater by at least a factor of 10 than a bit time of bits that are driven in the second communication phase.

It is possible that in the first communication phase, it is negotiated which of the user stations of the bus system in the subsequent second communication phase obtains, at least temporarily, exclusive, collision-free access to the bus.

The user station described above may be part of a bus system which also includes a bus and at least two user stations that are connected to one another via the bus in such a way that they may communicate serially with one another. At least one of the at least two user stations is a user station described above.

Moreover, the object stated above may be achieved by a method for communicating in a serial bus system in accordance with an example embodiment of the present invention. The method is carried out using a user station for a bus system in which at least one first communication phase and one second communication phase are used for exchanging messages between user stations of the bus system, the user station including a receiver and a device. In accordance with an example embodiment of the present invention, the method includes the steps: receiving via the receiver a signal from the bus of the bus system, generating via the receiver a digital signal from the signal received from the bus and outputting the digital reception signal to a terminal, evaluating via the device the digital reception signal with regard to a predetermined communication protocol that establishes when a predetermined communication phase, which indicates a subsequent transfer of useful data in a message, begins and ends, and reversing, via the device, the data flow of the digital reception signal to the receiver at the terminal for a time period of at least one bit if the evaluation of the device shows that data at that time are being received from the bus in the predetermined communication phase.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
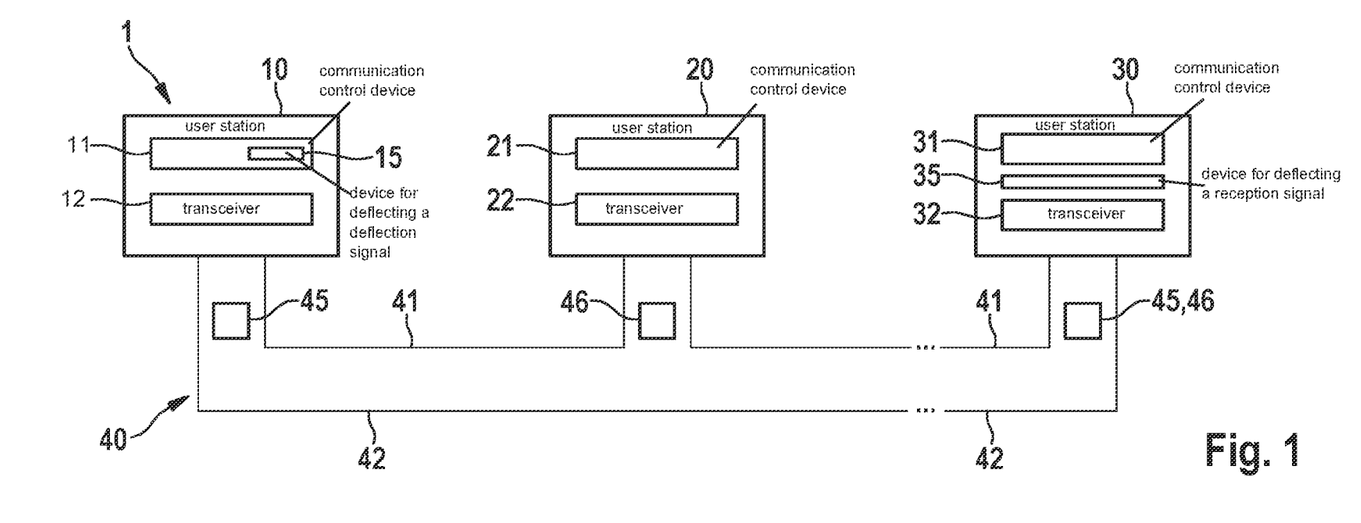
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN EL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L, and are used for electrical signal transfer after coupling in the dominant levels or generating recessive levels for a signal in the transmission state. Messages 45, 46 in the form of signals are serially transferable between individual user stations 10, 20, 30 via bus 40. User stations 10, 20, 30 are, for example, control units, sensors, display devices, etc., of a motor vehicle.

As shown in FIG. 1, user station 10 includes a communication control device 11, a transceiver device 12, and a device 15 for deflecting a reception signal RxD. In contrast, user station 20 includes a communication control device 21 and a transceiver device 22. User station 30 includes a communication control device 31, a transceiver device 32, and a device 35 for deflecting a reception signal RxD. Transceiver devices 12, 22, 32 of user stations 10, 20, 30 are each directly connected to bus 40, although this is not illustrated in FIG. 1.

Communication control devices 11, 21, 31 are each used for controlling a communication of particular user station 10, 20, 30 via bus 40 with at least one other user station of user stations 10, 20, 30 connected to bus 40.

Communication control device 11 creates and reads first messages 45, which are modified CAN messages 45, for example. Modified CAN messages 45 are built up based on a CAN EL format, described in greater detail with reference to FIG. 2.

Communication control device 21 may be designed as a conventional CAN controller. Communication control device 21 creates and reads second messages 46, for example conventional CAN messages 46. Conventional CAN messages 46 are built up according to the conventional base format, in which a number of up to 8 data bytes may be included in message 46. Alternatively, conventional CAN message 46 is built up as a CAN FD message, in which a number of up to 64 data bytes, which are also transferred at a much faster data rate than with conventional CAN message 46, may be included. In the latter case, communication control device 21 is designed as a conventional CAN FD controller.

Communication control device 31 may be designed to provide a CAN EL message 45 or a conventional CAN message 46 for transceiver device 32 or receive it from same, as needed. Communication control device 31 thus creates and reads a first message 45 or second message 46, first and second messages 44, 46 differing by their data transmission standard, namely, CAN EL or CAN in this case. Alternatively, conventional CAN message 46 is built up as a CAN FD message. In the latter case, communication control device 31 is designed as a conventional CAN FD controller.

Except for the differences described in greater detail below, transceiver device 12 may be designed as a CAN EL transceiver. Transceiver device 22 may be designed as a conventional CAN transceiver or as a CAN FD transceiver. Transceiver device 32 may be designed to provide messages 45 according to the CAN EL format or messages 46 according to the present CAN base format for communication control device 31 or receive the messages from same, as needed. Additionally or alternatively, transceivers 12, 32 may be designed as a conventional CAN FD transceiver.

A formation and then transfer of messages 45 having the CAN EL format, in addition to the reception of such messages 45, is achievable by use of the two user stations 10, 30.

Figure 2:
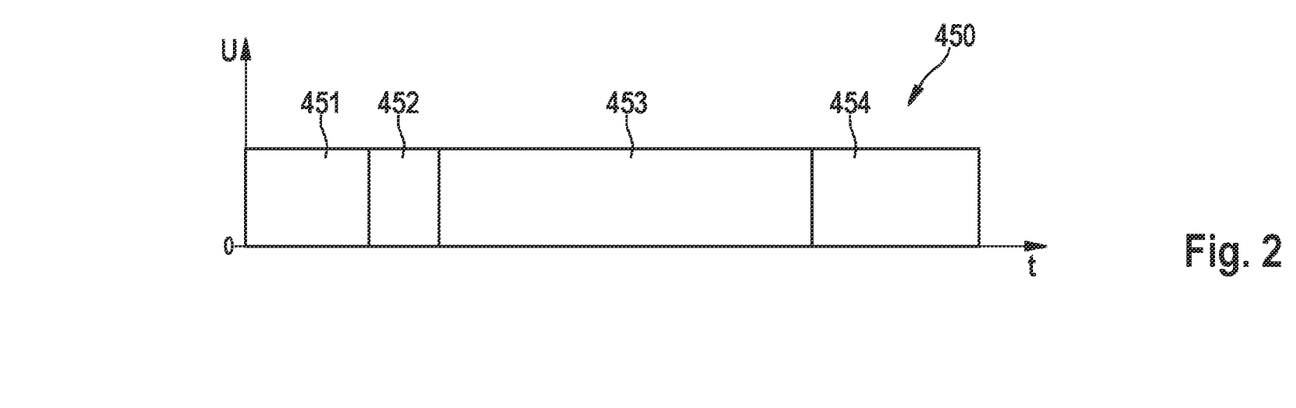
FIG. 2 shows a diagram for illustrating the design of messages that may be transmitted from user stations of the bus system according to the first exemplary embodiment of the present invention.

FIG. 2 shows for message 45 a CAN EL frame 450, which is transmitted from transceiver device 12 or transceiver device 32. For the CAN communication on bus 40, CAN EL frame 450 is divided into different communication phases 451 through 454, namely, an arbitration phase 451, an SoD 452, a data phase 453, and a frame end phase 454.

In arbitration phase 451, for example at the start a bit is transmitted, which is also referred to as an SOF bit and which indicates the start of frame. An identifier including 32 bits, for example, for identifying the sender of message 45 is also transmitted in arbitration phase 451. During the arbitration, with the aid of the identifier, bit-by-bit negotiation is carried out between user stations 10, 20, 30 concerning which user station 10, 20, 30 would like to transmit message 45, 46 having the highest priority, and therefore for the next time period for transmitting in SoD phase 452 and subsequent data phase 453, obtains exclusive access to bus 40 of bus system 1.

In SoD phase 452, in the present exemplary embodiment a piece of protocol format information contained in a bit is transmitted which is suitable for distinguishing CAN EL frames from CAN frames or CAN FD frames. This protocol format information is also referred to below as an identifier 457. In addition, a data length code that is 13 bits long, for example, may be transmitted, which may then, for example, take on values of 1 to up to 4096 by an increment of 1, or alternatively may take on values of 0 to 4095. The data length code may also include fewer or more bits, and the increment may take on other values.

The useful data of the CAN EL frame or of message 45 are transmitted in data phase 453. The useful data may include up to 4096 bytes, for example, or a greater value, corresponding to the value range of the data length code.

In frame end phase 454, a check sum of the data of data phase 453 may be contained in a check sum field, for example, including the stuff bits that are inserted as an inverse bit by the sender of message 45 in each case after a predetermined number of identical bits, in particular 10 identical bits. In addition, in frame end phase 454 at least one acknowledge bit may be contained in an end field. Furthermore, a sequence of 11 identical bits that indicate the end of CAN EL frame 450 may be present. By use of the at least one acknowledge bit, it may be communicated whether or not a receiver has found an error in received CAN EL frame 450 or message 45.

A physical layer, similarly as with CAN and CAN FD, is used at least in arbitration phase 451 and frame end phase 454. In addition, in SoD phase 452 a physical layer, similarly as with CAN and CAN FD, may be used at least in part, i.e., at the start. The physical layer corresponds to the bit transfer layer or layer one of the conventional Open Systems Interconnection (OSI) model.

An important point during these phases 451, 454 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

The arbitration at the start of a frame 450 or of message 45, 46, and the acknowledgement in frame end phase 454 of frame 450 or of message 45, 46 is possible only when the bit time is much more than twice as long as the signal propagation time between two arbitrary user stations 10, 20, 30 of bus system 1. Therefore, the bit rate in arbitration phase 451, in frame end phase 454, and at least partially in SoD phase 452 is selected to be slower than in data phase 453 of frame 450. In particular, the bit rate in phases 451, 452, 454 is selected as 500 kbit/s, resulting in a bit time of approximately 2 µs, whereas the bit rate in data phase 453 is selected as 5 to 8 Mbit/s, resulting in a bit time of approximately 0.2 µs and shorter. The bit time of the signals in the other communication phases 451, 452, 454 is thus greater than the bit time of the signal in data phase 453 by at least a factor of 10.

A sender of message 45 starts a transmission of bits of SoD phase 452 and of subsequent data phase 453 onto bus 40 only after user station 10, as the sender, has won the arbitration, and user station 10, as the sender, thus has exclusive access to bus 40 of bus system 1 for the transmission. The sender may either switch to the faster bit rate and/or the other physical layer after a portion of SoD phase 452, or may switch to the faster bit rate and/or the other physical layer only with the first bit, i.e., at the start, of subsequent data phase 453.

In general, in the bus system with CAN EL, in comparison to CAN or CAN FD in particular the following deviant properties may be achieved:

a) acquiring and optionally adapting proven properties that are responsible for the robustness and user-friendliness of CAN and CAN FD, in particular a frame structure including identifiers and arbitration according to the CSMA/CR method, b) increasing the net data transfer rate to approximately 10 megabits per second, c) increasing the quantity of the useful data per frame to approximately 4 kbytes, d) optionally, completely or partially dispensing with the sending of error frames when errors are detected. However, with transceiver devices 12, 32 it is possible for error frames to be further used, since the bus state transitions in the data phase are influenced only very briefly. Thus, error frames are able to dominate over the instantaneous bus traffic (6× dominant in succession), as required. This is advantageous from the standpoint of the user.

Figure 3:
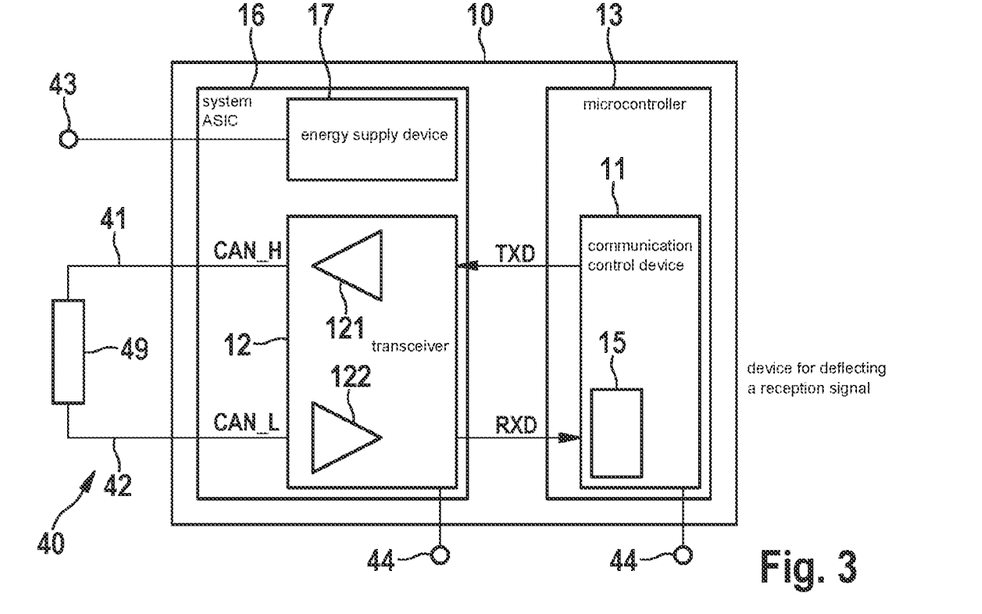
FIG. 3 shows a simplified schematic block diagram of a user station of the bus system according to the first exemplary embodiment of the present invention in a first operating mode.

FIG. 3 shows the basic design of user station 10 together with communication control device 11, transceiver device 12, and device 15. User station 30 has a design similar to that shown in FIG. 3, except that device 35 is not integrated into communication control device 31, but, rather, provided separately from communication control device 31 and transceiver device 32. Therefore, user station 30 and device 35 are not separately described. The functions of device 15 described below are present in an identical form for device 35.

According to FIG. 3, in addition to communication control device 11, transceiver device 12, and device 15, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V. However, energy supply device 17 may supply some other voltage having a different value and/or be designed as a power source, as needed.

Transceiver device 12 also includes a transmitter 121, a receiver 122, and an evaluation unit 125. Evaluation unit 125 may be designed as a switching block that in particular includes at least one transistor. This is described in greater detail below.

Even though transceiver device 12 is consistently referred to below, it is alternatively possible to provide receiver 122 in a separate device externally from transmitter 121. Transmitter 121 and receiver 122 may be designed as a conventional transceiver device 22. Transmitter 121 may in particular include at least one operational amplifier and/or one transistor. Receiver 122 may in particular include at least one operational amplifier and/or one transistor.

Transceiver device 12 is connected to bus 40, or more precisely, to its first bus wire 41 for CAN_H and its second bus wire 42 for CAN_L. The supplying of voltage for energy supply device 17 for supplying first and second bus wires 41, 42 with electrical energy, in particular with voltage CAN_Supply, takes place via at least one terminal 43. The connection to ground or CAN GND is achieved via a terminal 44. First and second bus wires 41, 42 are terminated via a terminating resistor 49.

In transceiver device 12, first and second bus wires 41, 42 are not just connected to transmitter 121 and to receiver 122, even though the connection in FIG. 3 is not shown for simplification.

During operation of bus system 1, transmitter 121 converts a transmission signal TxD of communication control device 11 into corresponding signals CAN_H and CAN_L for bus wires 41, 42, and transmits these signals CAN_H and CAN_L onto bus 40. Even though signals CAN_H and CAN_L are mentioned for transceiver 12, with regard to message 45 they are to be understood as signals CAN EL_H and CAN EL_L, which in data phase 453 differ from conventional signals CAN_H and CAN_L in at least one feature, in particular with regard to the formation of the bus states for the various data states of signal TxD and/or with regard to the voltage or the physical layer and/or the bit rate.

A difference signal VDIFF=CAN_H−CAN_L is formed on bus 40. Receiver 122 forms a reception signal RxD from signals CAN_H and CAN_L that are received from bus 40, and passes it on to communication control device 11, as shown in FIG. 3. With the exception of an idle or standby state, transceiver device 12 with receiver 122 during normal operation always listens to a transfer of data or messages 45, 46 on bus 40, in particular regardless of whether or not transceiver device 12 is the sender of message 45.

Device 15 is designed to recognize SoD phase 452 in a received message 45 from bus 40. For this purpose, device 15 may at least partially interpret the communication protocol used in bus system 1 for messages 45, or more precisely, for frame 450 from FIG. 2.

Figure 4:
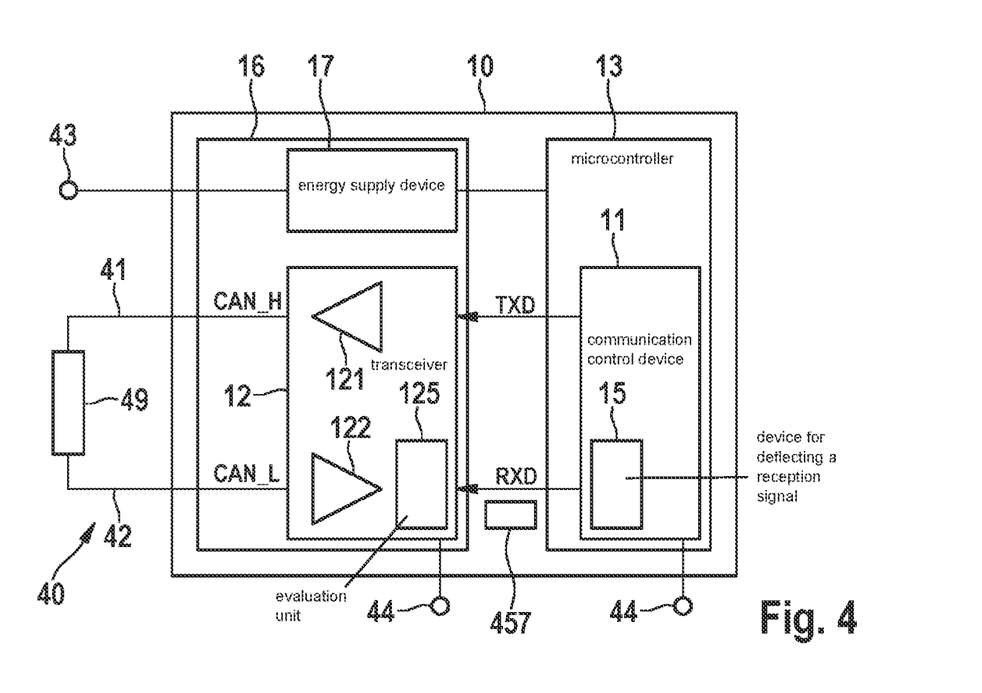
FIG. 4 shows a block diagram of a user station of the bus system according to the first exemplary embodiment of the present invention in a second operating mode.

If device 15 recognizes SoD phase 452, device 15 reverses the data flow at the terminal for reception signal RxD, as illustrated in FIG. 4. The reversal of the data flow at the terminal for signal RxD may be carried out in particular using a switch or switching block that includes at least one transistor.

In the operating mode illustrated in FIG. 4, communication control device 11 then transmits an identifier 457 to transceiver device 12, in particular its evaluation unit 125, at the terminal of reception signal RxD with the aid of device 15. In the present exemplary embodiment, identifier 457 is a bit that signals to transceiver device 12 the start of data phase 453. Either the logical "1" or the logical "0" may be used for the bit of identifier 457.

If the evaluation shows that SoD phase 452 is not being received at that time, device 15 ends the reversal of the data flow at the terminal for reception signal RxD, so that the operating mode from FIG. 3 is once again present.

Thus, in all other communication phases 451, 452, 454, device 15 makes no change to the data flow at the terminal for reception signal RxD. Therefore, the data are then led from transceiver device 12, or more precisely, its receiver 122, to communication control device 11 at the terminal for reception signal RxD, as is customary.

In order to recognize SoD phase 452, device 15 optionally may additionally use the evaluation already carried out by communication control device 11. The evaluation result of device 15 may thus be checked for plausibility. Optionally, one of the evaluations here may be weighted higher than the other, so that the evaluation may achieve various safety levels for the recognition of SoD phase 452.

In this way, device 15 indicates the switchover from arbitration phase 451 and SoD phase 452 into data phase 453 with a higher bit rate. The information concerning this point in time is thus available to transceiver device 12 to allow a switchover into fast data phase 453.

As a result, a galvanic connection via an additional terminal in each case at communication control device 11 and transceiver 12 connected thereto is not necessary in order for communication control device 11 to transfer the point in time of the bit rate switchover to transceiver device 12. This means that device 15 advantageously requires no additional terminal, which is not available at a standard housing. By using device 15, changing to another housing that is larger and expensive in order to provide an additional terminal is thus not necessary.

In addition, due to device 15, integration of a protocol controller functionality into transceiver device 12 is not necessary. Such a protocol controller could, among other things, recognize the SoD portion of message 45 and independently initiate data phase 453. However, since such an additional protocol controller would require considerable space in transceiver device 12 or ASIC 16, device 15, which additionally or alternatively may use the functionality of communication control device 11 that is already present, effectuates a significant reduction in the resource requirements.

Device 15 and evaluation unit 125 thus provide a very uncomplicated and cost-effective solution to indicate to transceiver device 12 the switchover from arbitration phase 451 and SoD phase 452 into data phase 453 with a higher bit rate.

The signals at transceiver device 12 according to FIGS. 3 and 4 during operation of bus system 1 are explained in greater detail below with reference to the signal patterns from FIGS. 5A through 8B.

FIGS. 5A through 8A each show a temporal profile of signals for transceiver device 12 according to the present exemplary embodiment as a function of time t. A transmission signal TxD, shown in FIG. 5A, results in the patterns of signals according to FIGS. 6A through 8A as a function of time t. The same signals according to FIGS. 5A through 8A result as a function of time t for transceiver device 32, which transmits and receives messages 45.

Figure 5A:
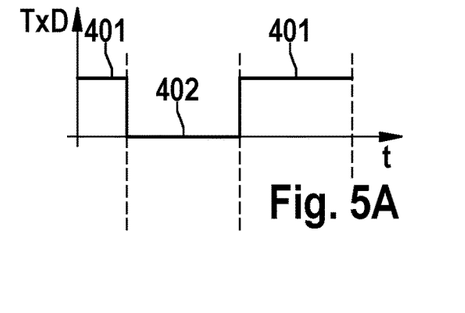
FIG. 5A shows a temporal profile of a transmission signal TxD for the user station according to the first exemplary embodiment of the present invention.
Figure 5B:
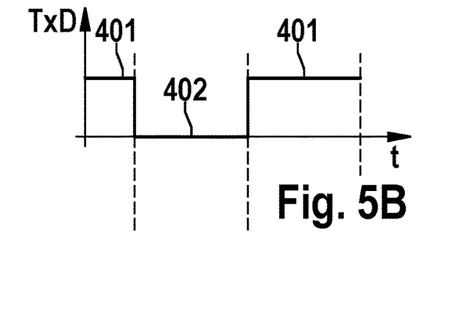
FIG. 5B shows a temporal profile of a transmission signal TxD for a conventional user station.

For transmission signal TxD from FIG. 5A, a state change from a first bus state 401 to a second bus state 402 and then back to first bus state 401 occurs over time t for three successive bits. First bus state 401 may also be referred to as a recessive state or high level, and corresponds to the logical "0" of transmission signal TxD. Second bus state 402 may also be referred to as a dominant state or low level, and corresponds to the logical "1" of transmission signal TxD. Transmission signal TxD from FIG. 5A results in voltage V for signals CAN_H and CAN_L according to FIG. 6A, differential voltage VDIFF=CAN_H−CAN_L according to FIG. 7A, and a reception signal RxD according to FIG. 8A. In first bus state 401 or a recessive state, voltage V for signals CAN_H and CAN_L corresponds to one-half of a bus bias voltage potential.

In comparison, FIG. 5B through FIG. 8B each illustrate the temporal profiles of signals for a transceiver device according to a conventional transceiver device, for example transceiver device 22 of user station 20. The same signals according to FIG. 5B through FIG. 8B result for the transceiver devices, which transmit and receive messages 46.

Figure 6A:
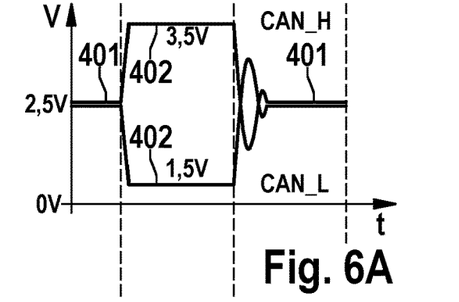
FIG. 6A shows a temporal profile of bus signals CAN_H and CAN_L for the user station according to the first exemplary embodiment of the present invention.
Figure 6B:
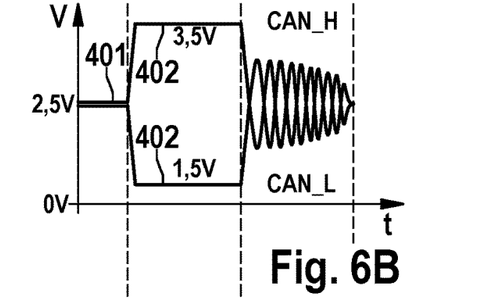
FIG. 6B shows a temporal profile of bus signals CAN_H and CAN_L for the conventional user station.
Figure 7A:
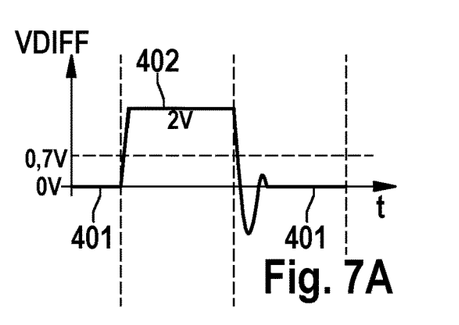
FIG. 7A shows a temporal profile of a differential voltage VDIFF of bus signals CAN_H and CAN_L for the user station according to the first exemplary embodiment of the present invention.
Figure 7B:
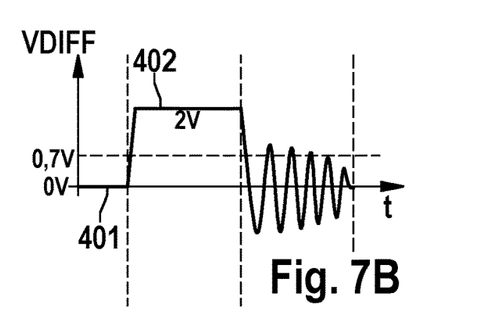
FIG. 7B shows a temporal profile of differential voltage VDIFF of bus signals CAN_H and CAN_L for the conventional user station.
Figure 8A:
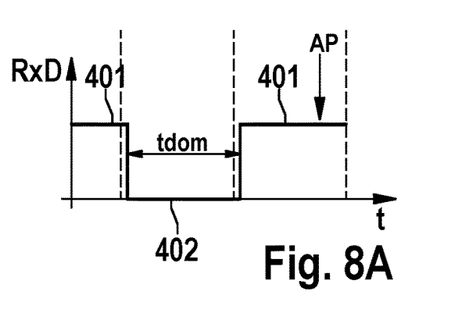
FIG. 8A shows a temporal profile of a reception signal RxD for the user station according to the first exemplary embodiment of the present invention.
Figure 8B:
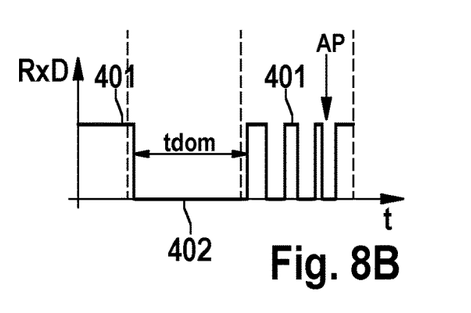
FIG. 8B shows a temporal profile of a reception signal RxD for a conventional user station.

A comparison of the signals from FIG. 6A and FIG. 6B shows very clearly that for a message 45, transceiver device 12 according to the present exemplary embodiment, for the same transmission signal TxD for a message 46, effectuates a much faster stabilization of signals CAN_H and CAN_L or of differential voltage VDIFF computed therefrom after the state change from state 401 to state 402 or from dominant to recessive. If the threshold voltage of a receiver of transceiver device 12 is set to the customary value of 0.7 V, as illustrated in FIGS. 7A and 7B, a receiver of transceiver device 142 recognizes no apparent state change from state 402 to state 401 or from recessive to dominant, even when there is a state change from state 401 to state 402 or from dominant to recessive. Sampling reception signal RxD at a sampling point AP, presently customary, may thus reliably yield the desired result, as illustrated in FIG. 8A. This applies even if the length of bit time tdom of state 401 or of a dominant bit is increased slightly compared to a conventional transceiver device or transceiver device 12 of user station 20, as is apparent from a comparison of FIGS. 8A and 8B.

Thus, transceiver device 12 according to the present exemplary embodiment is designed in such a way that transceiver device 12 has a lower tendency to oscillate compared to a conventional transceiver device or transceiver device 22, for example.

Due to the described design of transceiver device(s) 12, 32, much higher data rates may be achieved in the data phase than with CAN or CAN FD. In addition, the data length in data field 454 may be increased up to 4096 bytes. As a result, the advantages of CAN with regard to the arbitration may be retained, yet a higher volume of data may be effectively transferred in a shorter time period than previously, i.e., without the need for repeating the data due to an error, as explained below.

A further advantage is that error frames in bus system 1 are not necessary during the transfer of messages 45, but may optionally be used. Messages 45 are no longer destroyed when no error frames are used, which eliminates the need for a double transfer of messages. The net data rate increases as a result.

According to a second exemplary embodiment, in the SoD phase, device 15 causes the data flow at the terminal for reception signal RxD to be reversed for a longer phase than for the first exemplary embodiment. In this case, communication control device 11 then transmits a bit pattern as an identifier 457 which signals to transceiver device 12 the start of data phase 453. This bit pattern of identifier 457 has a predetermined sequence of bits, for example "101" or "010" or "01" or "10" or "1001," etc.

In this case, switchover unit 125 may be designed as a logic system, for example, in particular as a flip-flop.

In all other communication phases 451, 452, 454, the data are led from transceiver device 12 to communication control device 11 at the terminal for reception signal RxD, as is customary.

Otherwise, in the second exemplary embodiment, bus system 1 is designed in the same way as described above for the first exemplary embodiment.

All of the above-described embodiments of devices 15, 35, of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

Above-described bus system 1 according to the exemplary embodiments is described with reference to a bus system based on the CAN protocol. However, bus system 1 according to the exemplary embodiments may also be some other type of communications network in which data are serially transmittable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or more of user stations 10 or 30 to be present in bus system 1. It is possible for all user stations in bus system 1 to have the same design, i.e., for only user station 10 or only user station 30 or only user station 100 to be present.

What is claimed is:

1. A user station for a serial bus system, comprising:
   a transceiver device that includes a receiver configured to receive a signal from a bus of the bus system, wherein in the bus system at least one first communication phase and one second communication phase are used for exchanging messages between user stations of the bus system, and a transmitter for transmitting messages onto the bus; and
   a communication control device configured to control a communication of the user station with at least one other user station of the bus system, the communication control device including a device configured to evaluate a digital reception signal that is output by the receiver, the receiver being configured to generate the digital reception signal from the signal received from the bus and to output the digital signal to the device at a terminal, the device being configured to evaluate the digital reception signal with regard to a predetermined communication protocol that establishes when a predetermined communication phase of the first and second communication phases, which indicates a subsequent transfer of data in a message, begins and ends, and the device being configured to reverse a data flow of the digital reception signal to the receiver at the terminal for a time period of at least one bit when the evaluation of the device shows that data at that time are being received from the bus in the predetermined communication phase, wherein the device is configured to prompt the communication control device to transmit, at the terminal for the digital reception signal, an identifier having a predetermined value to the receiver in the predetermined communication phase in which the device reverses the data flow of the digital reception signal.

2. The user station as recited in claim 1, wherein the identifier is a bit having a predetermined value.

3. The user station as recited in claim 1, wherein the identifier is a predetermined bit pattern.

4. The user station as recited in claim 1, wherein the communication control device is configured to transmit a transmission signal to the transceiver device, and wherein the device is configured to compare the digital reception signal to the transmission signal generated by the communication control device to determine whether the identifier is to be transmitted.

5. The user station as recited in claim 1, wherein bus states of a signal received from the bus in the first communication phase are generated with a different physical layer than bus states of a signal received in the second communication phase.

6. The user station as recited in claim 1, wherein in the first communication phase, bits of signals have a bit time that is greater by at least a factor of 10 than a bit time of bits that are driven in the second communication phase.

7. The user station as recited in claim 1, wherein in the first communication phase it is negotiated which of the user stations of the bus system in a subsequent second communication phase obtains, at least temporarily, exclusive, collision-free access to the bus.

8. A bus system, comprising:
   a bus; and
   at least two user stations that are connected to one another via the bus in such a way that they communicate serially with one another, wherein at least one of the user stations includes:
      a transceiver device that includes a receiver configured to receive a signal from the bus of the bus system, wherein in the bus system at least one first communication phase and one second communication phase are used for exchanging messages between user stations of the bus system, and a transmitter for transmitting messages onto the bus, and
      a communication control device configured to control a communication of the user station with at least one other user station of the bus system, the communication control device including a device configured to evaluate a digital reception signal that is output by the receiver, the receiver being configured to generate the digital reception signal from the signal received from the bus and to output the digital signal to the device at a terminal, the device being configured to evaluate the digital reception signal with regard to a predetermined communication protocol that establishes when a predetermined communication phase of the first and second communication phases, which indicates a subsequent transfer of data in a message, begins and ends, and the device being configured to reverse a data flow of the digital reception signal to the receiver at the terminal for a time period of at least one bit when the evaluation of the device shows that data at that time are being received from the bus in the predetermined communication phase, wherein the device is configured to prompt the communication control device to transmit, at the terminal for the digital reception signal, an identifier having a predetermined value to the receiver in the predetermined communication phase in which the device reverses the data flow of the digital reception signal.

9. A method for communicating in a serial bus system, the method being carried out using a user station for a bus system, in which at least one first communication phase and one second communication phase are used for exchanging messages between user stations of the bus system, the user station including a receiver and a device, the method comprising the following steps:
   receiving via the receiver a signal from the bus of the bus system;
   generating via the receiver a digital reception signal from the signal received from the bus and outputting the digital reception signal to a terminal;

evaluating via the device the digital reception signal with regard to a predetermined communication protocol that establishes when a predetermined communication phase of the first and second communication phases, which indicates a subsequent transfer of data in a message, begins and ends; and reversing, via the device, a data flow of the digital reception signal to the receiver at the terminal for a time period of at least one bit when the evaluation of the device shows that data at that time are being received from the bus in the predetermined communication phase, wherein the device is configured to prompt the communication control device to transmit, at the terminal for the digital reception signal, an identifier having a predetermined value to the receiver in the predetermined communication phase in which the device reverses the data flow of the digital reception signal.

* * * * *